July 13, 1965

H. C. FLATON ETAL 3,194,255

CHECK VALVE

Original Filed July 31, 1958

United States Patent Office 3,194,255
Patented July 13, 1965

3,194,255
CHECK VALVE
Howard C. Flaton and John P. Thorel, Monroeville, Pa., assignors to Westinghouse Electric Corporation, East Pittsburgh, Pa., a corporation of Pennsylvania
Continuation of application Ser. No. 752,342, July 31, 1958. This application July 9, 1962, Ser. No. 208,289
7 Claims. (Cl. 137—220)

This application is a continuation of application Serial No. 752,342, now abandoned, filed July 31, 1958, and entitled "Check Valve."

The present invention relates to a check valve of a streamlined center-guided design and particularly to a valve of the character described adapted for use within the inlet or outlet ports of certain types of fluid handling equipment and adaptable for operation in variety of fluid flow conditions.

In known types of check valves, the valve seating member usually is furnished in the form of a flapper or the like operable by gravity or by reverse fluid flow to close the check valve. The prior valves, however, due to their structure, cause considerable pressure drop in the fluid system in which they are employed. Moreover, when actuated by a reverse fluid condition having a relatively steep wave front, these valves usually tend to slam, with resultant damage to the component parts of the valve, the entire fluid system, and instrumentation associated with the system. As a result of slamming, prior check valves frequently wear rapidly and fail to reopen when forward fluid pressure is reestablished.

In many of the known check valves, a spring or other biasing means is employed to urge the valve to its closed position and the valve is maintained at its open position only when fluid is circulated in the forward direction through the system, as by suitable pumping means or the like. Under conditions of no flow, then, the check valve would be closed. In certain applications, for example in supplying a coolant medium to a source of heat for purposes either of extracting power therefrom or of cooling the source of heat, it is desired to permit the check valves to remain open under conditions of substantially no flow in order that residual heat can be removed from the heat source by the well-known thermosyphoning phenomenon. The relatively small flow occasioned in the cooling fluid by thermosyphoning would not induce sufficient pressure to open many types of conventional check valves which are biased as aforesaid to their closed positions.

There are other applications wherein it is not necessary or desirable to prevent reverse flow, but only to terminate the flow of fluid in the system when the rate of flow exceeds a given rate of acceleration. This is particularly true in a hydraulic system wherein water or other relatively non-compressible fluid might be accelerated to produce what is known as a water hammer. The force of the acceleration, if uncontrolled, would be transmitted to all portions of the fluid system with resultant damage to the more fragile portions thereof. Accordingly, the invention contemplates a check valve, one form of which is actuable to its closed position when the fluid exceeds a given rate of acceleration.

On the other hand, by proper selection of a spring associated with the check valve of the invention and by providing certain clearances or orifices at mating parts of the check valve, a time delay either in opening or closing the check valve can be obtained. In certain arrangements of the check valve, a biasing spring if employed therewith is completely captivated or enclosed within portions of the check valve to eliminate any possibility of loss or of damage thereto by any foreign objects within the system.

It is contemplated that the check valve of the invention can be cooperatively associated with various fluid handling apparatus, for example a pump of the impeller or centrifugal type such as that described and claimed in copending application of O. P. Steele III et al., Serial No. 637,210, filed January 30, 1957, now Patent 2,964,659, issued December 13, 1960; G. E. Bollibon et al., Serial No. 758,809, filed September 3, 1958, now Patent 2,972,-309, issued February 21, 1961; and of G. E. Bollibon et al., Serial No. 747,771, filed July 10, 1958, now Patent 3,013,500, issued December 19, 1961, all of which are assigned to the present assignee. When employed in this fashion, the check valve, because of its streamlined and center-guided characteristics, cooperates with the pump casing to control the entrance or suction flow characteristics of the pump and to assure the proper velocity transition from the suction port of the pump to the eye of its impeller. In the latter-mentioned installation, the check valve is disposed so that accidental disassembly of certain components of the pump during operation positively is prevented. The presence of the check valve also deflects foreign objects in the system which otherwise may reach and damage the pump impeller. The structure of the check valve is arranged so that the inlet piping of the pump can be furnished with a relatively large size in order to provide complete structural support for the pump and the driving mechanism frequently associated therewith. Enlargement of the inlet piping for this purpose can be accomplished in accordance with the invention without detriment to the hydraulic efficiency of the pump.

For a more specific description of this combination of a check valve and a pump, reference may be had to application Serial No. 197,147, filed May 23, 1962, and entitled "Check Valve and Application Thereof," the latter application being a divisional application of parent application Serial No. 752,342, filed July 31, 1958, and with the instant application being a continuation application of the aforesaid parent application.

In view of the foregoing, an object of the present invention is the provision of a novel and efficient check valve.

Another object of the invention is the provision of a check valve of the center-guided type having novel means associated therewith for opening or closing the check valve.

Still another object of the invention is the provision of a check valve which can be biased conveniently to either the open or closed position thereof.

A further object of the invention is the provision of a check valve having means associated therewith to prevent slamming or too sudden closure of the check valve.

Another object of the invention is the provision of a check valve which will remain open under no-flow conditions in the system with which the valve is employed.

Another object of the invention is the provision of a check valve which is closed when the acceleration of fluid flow in the system within which the valve is utilized reaches a predetermined or excessive value.

More specifically, it is an object of the invention to provide an acceleration-sensitive check valve which is actuated to its closed position when the flow of fluid exceeds a predetermined acceleration in the reverse direction of flow.

A further object of this invention is to provide a check valve of the center-guided type which is so sensitive to flow conditions, that substantially instantaneously upon reverse flow in the system, the check valve moves to its closed position thereby minimizing any "water hammer in the system."

Still another object of this invention is to provide a check valve of the center-guided type wherein a valve disc is mounted for movement toward and away from one end of the housing and having the opposed end of the housing formed so that its outward extent is fixedly positioned independently of the position of the valve disc.

The foregoing and additional objects, features and advantages of the invention will be elaborated upon during the ensuing description of exemplary modifications of the invention, with the description being taken in conjunction with the accompanying drawings; wherein.

As used herein, the term "annular" is defined to be descriptive of a member having a substantially central opening therein, such as a ring-shaped member. However, the shape of such annular member should not be interpreted to be limited to a member of circular cross section having a circular central opening. Rather it is specifically intended to include members and openings of different, and even irregular, cross sectional configurations.

Figure 1:
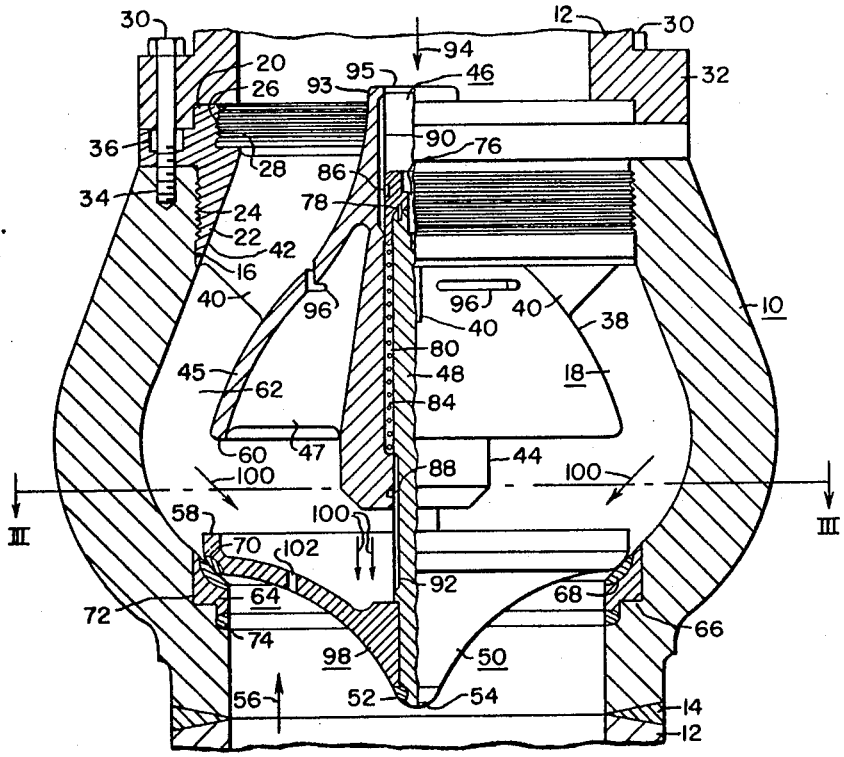
FIGURE 1 is a longitudinal partially sectioned view of a check valve of the character described adapted for use in a line application.
Figure 2:
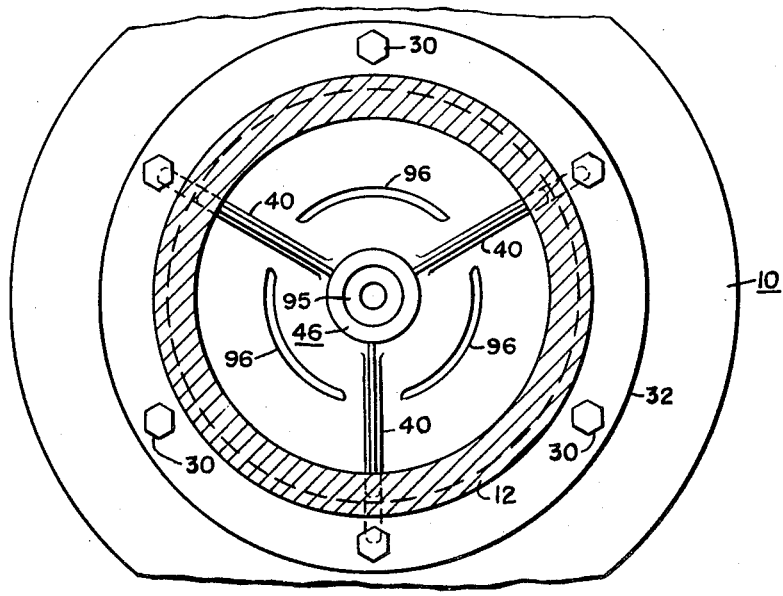
FIG. 2 is a top plan view of the check valve arrangement illustrated in FIG. 1.
Figure 3:
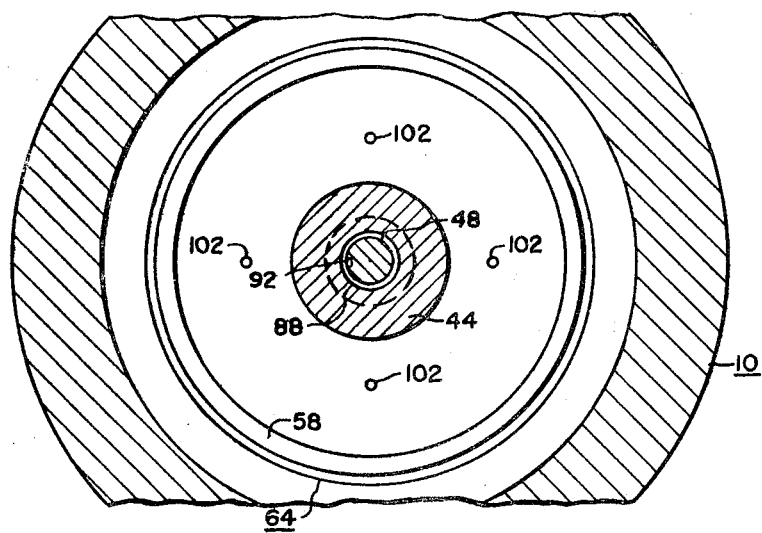
FIG. 3 is a cross-sectional view of the check valve illustrated in FIG. 1 of the drawings and taken along reference line III—III thereof.

Referring now to FIGS. 1 to 3 of the drawings, the illustrative form of the invention shown therein comprises a casing 10 which is adapted at the lower end thereof as viewed in FIG. 1 for joining and sealing to a system conduit denoted generally by the reference character 12, for example, by means of an annular sealing and structural weld 14. To the other end of the casing 10, another portion of the system conduit 12 is joined in the manner described hereinafter. Upper opening 16 of the casing 10 is provided with such diameter that the components of a check valve 18 can be inserted therethrough into the casing 10.

A check valve 18 arranged pursuant to the invention is positioned within the casing 10 by means of an annular ring member 20. The lower portion of the ring member 20 is provided with a tapered continuous projection 22. The outer surface of the projection 22 is threaded for engagement with a similarly threaded inner peripheral portion of the opening 16 as denoted by the reference numeral 24. The inner surface of the upper portion of the ring member 20 also is threaded, as denoted by the reference numeral 26, and thus is engageable with a similarly threaded extension 28 of the upper conduit portion 12. When the casing 10, the annular supporting member 22 and the upper conduit portion 12 are thus threadedly engagd, disassembly thereof is prevented positively by means of a plurality of mounting bolts 30 inserted through suitable apertures in a flange 32 furnished at the lower end of the upper conduit portion 12 and threaded into suitably tapped apertures 34 disposed in the upper end of the casing 10. The supporting member 20 is provided with an outwardly extending flange 36 inserted between the conduit flange 32 and the upper end of the casing 10. When the mounting or clamping bolts 30 are secured as shown in FIG. 2 of the drawings, the full clamping force thereof is transmitted through the supporting member flange 36.

The stationary components, including a housing 38, of the check valve 18, are secured to the tapered surface 42 of the annular member 22 by means of a plurality of radial connecting ribs 40. In this arrangement of the invention three such ribs 40 are annularly spaced and are employed as better shown in FIG. 2 of the drawings. The ribs are integrally connected to the tapered surface 42 of the annular retaining member 20 and to the upper or reduced portion of the valve housing 38. The housing 38 is provided in addition with a central longitudinally extending hub 44 through which a longitudinal cavity 46 is formed. The flared portion 45 of the valve housing 38 is stabilized relative to its hub 44 by means of a plurality of radial connecting ribs 47. In this arrangement of the invention, three annularly spaced stabilizing ribs 47 are employed.

The cavity 46 desirably is circular in cross section and is adapted to receive a stub shaft 48 (FIG. 1). The stub shaft 48 is connected at its lower end to a valve disc or closure member 50, for example, by an annular weld 52. In this example, the valve disc 50 is more or less of a conical configuration and because of its downwardly extending central protrusion 54, a minimum of resistance is offered to liquid flowing through the conduit 12 in the direction indicated by the flow arrows 56. The configuration of the valve disc 50 together with the flared or bell-shaped configuration of the valve housing 38 presents a modified but streamlined, teardrop design to the flow of fluid through the check valve and thereby greatly minimizes fluid friction therein. This is especially advantageous when this configuration is employed in connection with the check valve when mounted in the suction opening of a pump or the like.

As shown in FIG. 1, the internal wall surfaces of the casing 10 are provided with a similar and complementary configuration so that when the valve disc 50 is moved upwardly to a position (not shown) whereat its upper edge surface 58 is seated against the lower edge surface 60 of the valve housisng 38, a smooth annular flow passage 62 is formed between the inner wall of the casing 10 and the outer periphery of the check valve 18. The resistance of this annular flow passage 62 to the flow of fluid has been found to be relatively low. The smooth internal contour of the casing 10 is maintained by the annular supporting member 22, which is arranged so that its tapered surface 42 forms a complementary extension of the inner casing wall.

In this arrangement of the invention, a valve seating member 64 is joined to the inner wall surface of the casing 10 and disposed at the lower constricted portion 66 thereof. The valve seating member 64 is provided with an annular band 68 of extremely hard material, such as Stellite, and is adapted to cooperate with a similar annular band 70 formed adjacent the outer extremity of the valve disc 50 and thereby disposed for enegagement with the valve seat 68 upon movement of the valve disc 50 and associated components to the position illustrated in FIG. 1 of the drawings. The valve seat arrangement 64 is secured in an annular groove 72 formed in the adjacent wall portion of the casing 10. When the valve seating member 64 is thus inserted, it is joined to the casing 10 by means, for example, of an annular weld 74.

As indicated previously, the valve disc 50 is provided with a stub shaft 48 which is mounted for longitudinal movement within the central cavity 46 of the hub member 44. The stub shaft 48 at its free end terminates in an end cap 75 secured in place by a machine screw 76. Rotation of the end cap 75 relative to the shaft 48 is prevented by means of a locking pin 78. The end cap 75 is of a relatively larger outer diameter than the shaft 48 and since the end cap is closely fitted within the cavity 46, an annular space 80 is formed between the hub 44 and the shaft 48. The lower end of the hub 44, however, is provided with an inwardly extending lip 82 whereby the shaft 48 is closely fitted within the outward end portion of the hub 44 in the region of entry of the shaft 48 therein.

A compressional spring 84 is inserted into the annular space 80 and is retained by the aforementioned lip 82 and the overhanging portion of the end cap 75. The spring 84 thereby at least partially counteracts the weight of the valve disc 50 and its shaft 48 and therefore can be employed to maintain the disc 50 in a normally open position against the lower edge 60 of the valve housing 18 or in a normally closed position against the valve seat 64.

In this arrangement, the spring 84 is selected to permit opening of the valve disc 50 with a very slight forward or positive pressure differential. The end cap 75 and the lip 82 of the hub 44 are provided with piston rings 86 and 88, or the like, in order to prevent uncontrolled leakage through the normal manufacturing clearances existing between the end cap 75 and the walls of the cavity 46 and between the shaft 48 and the hub 44 where the former is inserted through the lip 82.

Adjacent the upper end of the hub cavity 46, a longitudinally extending groove 90 is furnished, with the length thereof being approximately equal to the extent of travel of the stub shaft 43. A similar groove 92 is cut in the surface of the shaft 48 adjacent the lip 82 of the hub 44. The groove 92 is equivalent in length to the groove 90 and both of these grooves are relatively narrow, as indicated by the groove 92 in FIG. 3 of the drawings. As a result, a controlled leakage or admittance of fluid relative to the annular space 80 is attained during operation of the check valve. This controlled leakage into or out of the space 80 produces a dashpot effect and prevents a sudden opening or closing of the valve disc 50. Accordingly, slamming of the disc 50 against the valve seat 68 or against the lower end 60 of the valve housing 18 is avoided.

In the arrangement as shown in FIGS. 1 to 3 of the drawings, it will be seen that the check valve is fabricated from a minimum of component parts and that structurally the check valve is rather uncomplicated. Moreover, the check valve can be readily disassembled by disengaging the upper conduit section 12 from the casing 10 and removing the check valve including the housing 38 and the disc 50 simply by threading and lifting the annular supporting member 22 out of the casing 10.

It will also be seen that the annular passage 62 between the check valve 18 and the casing 10 induces a streamlined fluid flow therethrough with a minimum of pressure drop. In this arrangement of the invention, the check valve 18 is biased to its open position by means of the compressional spring 84 associated with the stub shaft 48. However, as will be shown subsequently, a relatively large biasing spring can be mounted between the valve disc 50 and the housing 38 in order to bias the check valve to its closed position.

Figure 1A:
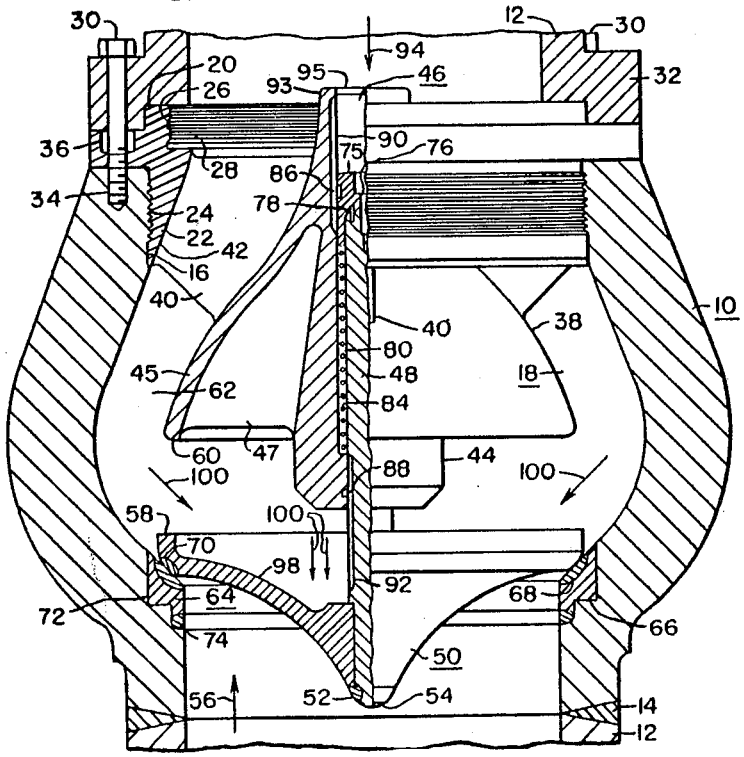
FIG. 1A is a view similar to FIG. 1 of another form of the invention.

The arrangement shown in FIG. 1A is similar to the arrangement shown in FIG. 1 and accordingly needs no further description as like reference characters are utilized to denote like parts. In the arrangement shown in FIG. 1A, however, the check valve 18 is closed by means of a pressure surge having a relatively steep wave front or acceleration and traveling through the fluid in the conduit 12 as denoted by flow arrow 94. This pressure surge is applied in one arrangement through open end 95 of the cavity 46 to the upper end of the end member 75, thereby causing the shaft 48 and the valve disc 50 to move downwardly to the position, viewed in the drawings. Because of the relatively small area of the end member 75 which is exposed to the pressure surge, a considerable acceleration of fluid is required to operate the check valve.

In addition to the aforesaid actuating means described in conjunction with FIGURE 1A, the arrangement of the invention illustrated in FIGS. 1 to 3 includes actuating means wherein a plurality of slots 96 are provided in the outer skirt of the valve housing 38 such that the pressure surge is applied initially to the inner surface 98 of the valve disc 50 through the relatively static pressure transmitting volume of fluid entrapped within the housing 38 when the valve disc 50 is in its open position. With this arrangement, a smaller acceleration of fluid is required to close the check valve 18. It will be obvious that a greater or lesser number of slots 96 can be employed depending upon the amount of fluid acceleration which can be tolerated within the system or at which it is desired to close the check valve 18. Once the check valve 18 is closed, however, a relatively small amount to fluid pressure transmitter in the direction of the flow arrow 94 is required to maintain the check valve in its closed position since this pressure then is acting freely upon the entire upper surface 98 of the valve disc 50, as denoted by arrows 100.

Obviously, the aforesaid actuating means for the valves illustrated in FIG. 1A and in FIGS. 1–3 may be used conjunctively or separately, depending upon the particular closing requirements of the check valve.

The embodiment of the invention shown in FIGS. 1–3 is suited to be utilized in those applications wherein a small amount of reverse flow through the conduit 12 and the associated components of the fluid system (not shown) is employed, for example to furnish heat thereto in order to prevent thermal shock. In furtherance of this purpose, reverse flow means such as a plurality of reverse flow apertures 102 are extended through the valve disc 50 in order to permit a limited reverse flow through the check valve 18 when the latter is in its closed position. As better shown in FIG. 3 of the drawings, four such flow apertures 102 are utilized in this arrangement, although a greater or lesser number of apertures or different sizes of apertures can be employed depending upon the amount of reverse flow required.

Thermal cycling through the valve 18 can be achieved in the FIGS. 1 and 1A embodiments of this invention at no flow conditions with the valve disc 50 located adjacent the valve seat 64 by proper choice of the spring 84. More specifically, in the FIG. 1 embodiment of the invention, under no flow conditions and with the valve mounted with its axis extending vertically, the weight of the valve disc 50 will move the disc toward the seat 84 to close the valve. The only force opposing such closing of the valve is the biasing means or spring 82. Thus by selecting an appropriate spring size and spring constant, the valve disc can be slightly displaced from the valve seat during no flow conditions. Of course upon reverse flow, the valve would be completely closed by the fluid force.

Figure 4:
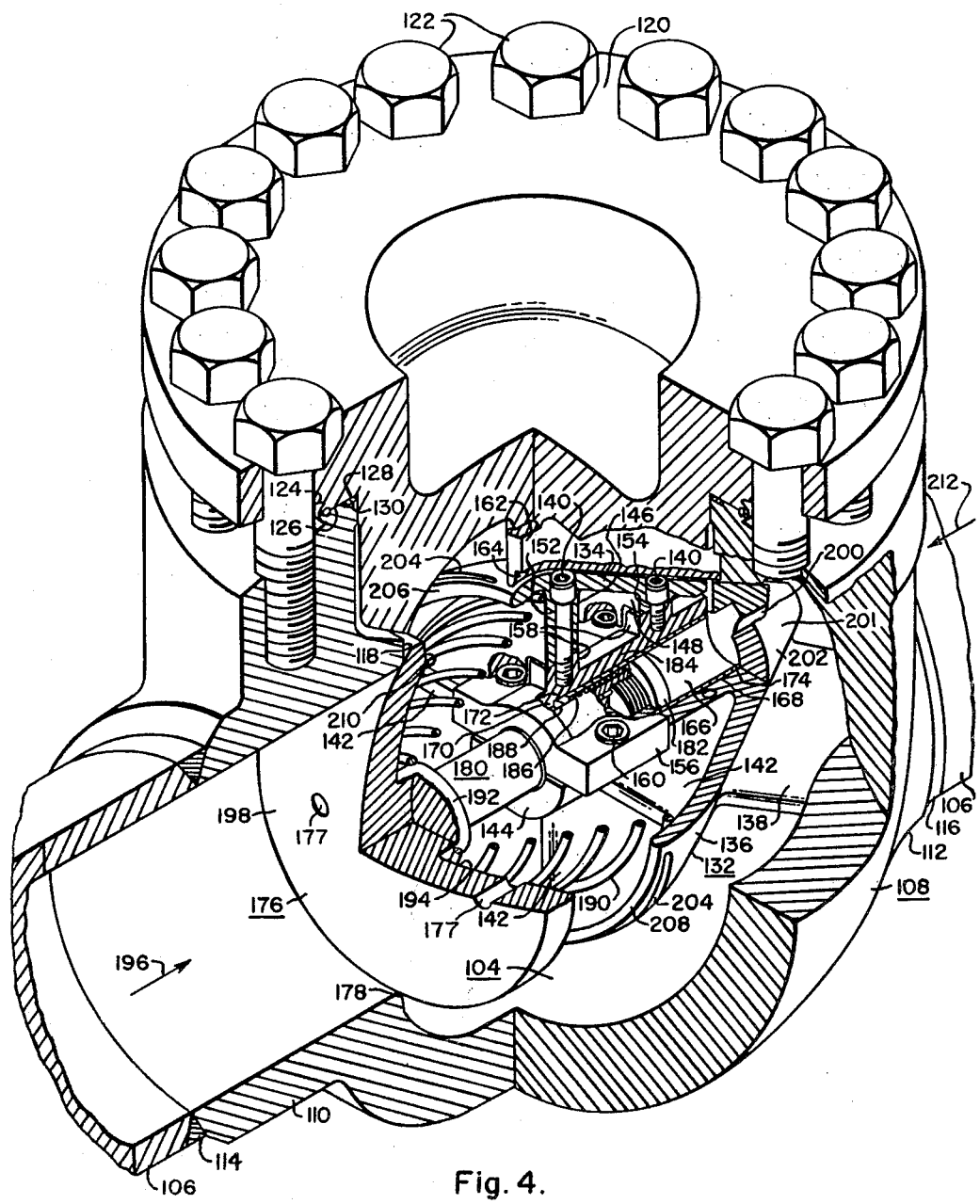
FIG. 4 is an isometric view of another form of the check valve arranged in accordance with the invention with portions thereof having been broken away and other portions sectioned for purposes of clarity.

Referring now to FIG. 4 of the drawings, another form of check valve within the contemplation of the invention is illustrated therein. In this arrangement of the invention, a check valve 104, although generally similar in construction to the check valve 18 of FIGS. 1 to 3, is provided with means for biasing the check valve to its closed position and in addition is rendered capable of mounting in or removal from a conduit 106 without physical separation of portions of the conduit 106. More specifically, the check valve 104 includes a casing 108 within which the check valve 104 is mounted. The casing 108 is provided with inlet and outlet ports 110 and 112 which can be permanently connected to portions of the conduit 106 respectively, for example by means of annular welds 114 and 116. The casing 108 is provided with a side opening 118 which is closed by a cover member 120 and secured in its closed position by a plurality of flange bolts 122. However, in hermetically sealed applications the cover member first is hermetically sealed to the casing 108 by means of a canopy seal or weld container 124 extending continuously about the junction 126 between the cover member 120 and the adjacent portion of the casing 108. A sealing gasket 128 desirably also is provided and is seated into an annular groove 130 also disposed at the junction 126. A suitable form of the canopy seal or weld container 124 is disclosed and claimed in Patent 2,805,789, issued September 10, 1957 to E. J. Kreh, Jr., et al. and assigned to the assignee of the present application.

The casing opening 118 is sufficiently large to permit insertion or removal of the component parts of check valve 104, including the valve disc 176 and its shaft 180 and the hub sleeve 168, all of which are described hereinafter. With the exception of a portion of valve housing 132, the components of the check valve 104 are readily removable from the casing 108. Specifically, all moving or wearing components of the valve 104 can be removed for repair or replacement through the opening 118 upon disengagement of the housing section 134 and the hub section 156 in a manner described subsequently in detail.

In this arrangement of the invention, the valve housing 132 comprises a detachable section 134 and a stationary section 136. The stationary housing section 136 is more or less permanently mounted within the casing 108 by means of a plurality of supporting ribs 138. In this arrangement of the invention, three such annularly spaced supporting ribs 138 are employed and to prevent accidental disassambly thereof within the hermetically sealed system, desirably are welded to the stationary housing section 136 and to the adjacent inner wall surface of the casing 108.

The valve housing 132 is completed with the detachable housing section 134 shaped complementarily with the stationary housing section 136. When assembled, each of the housing sections 134 and 136 form approximately one-half of the flared or bell-shaped housing 132. The detachable housing section 134 is secured to the check valve 104 by a pair of cap screws 140 in a manner described subsequently in greater detail.

The stationary housing section 136 is stabilized by a plurality of longitudinally extending internal ribs 142 which in addition support an arcuate hub section 144 centrally of the housing section 136. In this arrangement, three such annularly spaced ribs 142 are employed and desirably are secured to the hub section 144 and to the housing section 136 by welding. The hub section 144 conveniently is semicircular in cross section for reasons hereinafter made apparent.

On the other hand, the detachable housing section 134 is stabilized by a pair of transversely extending ribs 146 and 148. The ribs 146 and 148 are of generally semicircular configuration and desirably are welded to the inner surface of the detachable housing section 134. The ribs 146 and 148 and the detachable housing section 134 are provided respectively with apertures 152 and 154 through which the cap screws 140 are inserted respectively. The cap screws 140 serve to secure the detachable housing section 134 to a removable hub section 156, which in furtherance of this purpose is provided with a pair of internally tapped projections 158, the tapped portions of which are aligned with the apertures 152 and 154 into which the cap screws 140 are threaded.

However, the removable hub section 156 is first secured to the hub section 144 of the stationary housing section 136. This is accomplished in this arrangement by means of cap screws 160 inserted through suitable apertures in opposed flanges of the removable hub section 156 and threaded into the internal stabilizing ribs 142. When the detachable housing section 134 is subsequently placed over the removable hub section 156, the stabilizing ribs 146 and 148 of the housing section 134 overlie the cap screws 160 of the removable hub section 156 to preevnt their disengagement and loss into the fluid stream flowing through the conduit 106 and the casing 108. The stabilizing ribs 146 and 148 are secured in their cap screw retaining positions, of course, when the detachable housing section 134 is joined to the removable hub section 156 as described previously.

When the check valve 104 has been fully assembled, the closure 120 is secured in position and is hermetically sealed and joined to the casing 108 as described heretofore. To aid in mounting and positioning components of the check valve 104 within the casing 108, an additional stabilizing disturbance-equalizing rib 162 is secured to the undersurface of the closure 120, as by welding. When the detachable housing section 134 is in position, the inner edge 164 of the stabilizing rib 162 forms a relatively close fit with the outer surface of the housing section 134. In this fashion, the stabilizing rib 162 and the ribs 138 mentioned previously together provide adequate support to the bipartite housing 132 of the check valve. The cover rib 162 performs an added function of positively retaining the cap screws 140 in their threaded positions. This is accomplished by mounting the stabilizing rib 162 in the plane of the axes of the cap screws 140 so that the inner edge 164 of the rib 162 substantially encloses the apertures 152 and 154 through which the screws 140 are inserted.

When fully assembled, the semicircular hub sections 144 and 156 cooperate to enclose a central longitudinal cavity 166 extending therethrough. A continuous sleeve or sheath member 168 is retained within the cavity 166, when the hub sections 144 and 156 are engaged, and is positioned by an annular shoulder 170 formed upon the hub sections 144 and 146 and by a cooperating shoulder 172 furnished at the outer surface of the sleeve 168. In furtherance of this purpose, the upper end of the sleeve 168 terminates at another annular shoulder 174 likewise formed by inwardly projecting portions of the hub sections 144 and 156.

The check valve includes a valve disc 176 which is arranged to engage a valve seat 178 extending about the inner periphery of the casing 108. The valve disc is provided with a stub shaft 180 extending centrally thereof and mounted for sliding movement within the hub sleeve 168. The free end of the shaft 180 terminates in a relatively large cap screw 182, the outer end of which forms a piston cooperatively engaging the inner surface of the sleeve 168.

The shaft 180 is spaced from the major proportion of the sleeve 168 to form an annular space 184 therebetween, and consequently the outer end portion of the cap screw 182 overhangs the stub shaft 180. A compressional spring 186 is mounted within the annular space 184 for engagement with the overhanging cap screw portion and with a reduced sleeve portion 188. The shaft 180 forms a relatively close fit with the reduced sleeve portion 188 and a dashpot effect is obtained by leakage of fluid into or out of the annular space 184 in this arrangement through the normal manufacturing tolerances existing between the shaft 180 and the cap screw 182 and the juxtaposed portions of the sleeve 168.

In this arrangement of the invention, the check valve 104 is maintained in its closed position under conditions of no-flow or of a tendency to reverse flow by means of a relatively strong generally conical spring 190. The spring 190 is of the compressional type and is retained by the longitudinal ribs 142 of the stationary housing section 136 and by the adjacent transverse rib 146 of the detachable housing section 134 at the larger end of the spring and at its smaller end by engagement with the central hub 192 and adjacent inner surface 194 of the valve disc 176. The conical shape of the spring 190, when mounted in this fashion, assures that the force of the spring is applied centrally of the valve disc 176 so that lateral deflection thereof is avoided together with attendant wear of its stub shaft 180 and other parts of the valve which are in engagement therewith.

Openings 177 may be provided in the valve disc 176 to permit thermal cycling of fluid when the valve disc 176 is in engagement with the valve seat 178.

In the operation of this form of the invention, the check valve 104 normally is maintained in its open position by the force of fluid traveling normally through the conduit 106 in the direction indicated by flow arrow 196. A portion of this force is transmitted to the outer surface 198 of the valve disc 176 to displace the valve disc from the valve seat 178 against the action of the biasing spring 190. However, when the flow indicated by arrow 196 ceases or when a backward pressure surge occurs, the check valve 104 immediately closes.

When normal flow in the forward direction is resumed, however, immediate opening of the check valve 176 is assured particularly by use of the smaller compressional spring 186 tending to move the stub shaft 180 to the open position of the valve disc 176. The latter-mentioned spring applies a relatively small force to the cap screw 182, thereby reducing friction between the cap screw and shaft 180 and the sleeve 168 and the possibility of these parts, hanging up within the sleeve. A longitudinal channel 200 extends through the forward end portion 202 of the hub assembly 144-156 in order to permit equalization of fluid pressure within the cavity 166 as the cap screw 182 is moved therein during opening or closing of the check valve. In this arrangement, the hub end portion 202 is formed integrally with the stationary housing section 136.

It is contemplated that the large biasing spring 190 can be omitted and that the check valve 104 can be made acceleration sensitive as is the case of the check valve described previously in connection with FIGS. 1 to 3 of the drawings, by provision of a plurality of circumferential openings 204 formed adjacent the flared edges 206 and 208 of the housing sections 134 and 136 respectively. With the spring 190 having been removed, the valve disc 176 would normally be maintained in its fully open position with its edge portion 210 in engagement with the aforesaid flared edges 206 and 208 of the valve housing 132, by action of the spring 186. A sudden pressure surge in either direction of flow through the conduit 106 therefore would be transmitted through the openings 204 to the pressure transmitting volume formed within the housing and the valve disc 176 and thence to the inner surface 194 of the valve member 176 to close the valve member 176 as described in connection with the valve disc 50 of FIGS. 1 to 3. However, in the absence of this acceleration, the valve disc 176 or 50 would not close irrespective of the rate or direction of flow within the conduit 106. Thus, if it were desired to cause fluid to flow in the reverse direction through the conduit 106 as denoted by flow arrow 212, the check valve 104 would not close if the fluid were accelerated gradually to its desired rate of flow. In the latter-described arrangement of the check valve 104, with the biasing spring 190 removed as aforesaid, the check valve 104 is acceleration responsive to the fluid flowing in a direction indicated by the flow arrow 212. Of course, if the check valve 104 is mounted in a vertically disposed conduit, the valve disc 176 could undesirably be slightly displaced from its seat during no flow conditions by proper selection of the spring 186 as previously described in connection with FIGS. 1 and 1A.

It is to be noted that apertures 96 of FIG. 1 and 204 of FIG. 4 are always in communication with the pressure transmitting volume entrapped by the respective valve housings and valve discs. Thus independently of the position of the valve discs of FIGS. 1 and 4, upon the initiation of reverse flow, the force of such reverse flow instantaneously is transmitted to the pressure transmitting volume and thence to the valve disc to initiate closing movement of the valve disc. It is to be realized that water hammer results when a fluid flowing at a relatively high velocity is abruptly stopped. By having the openings 96 and 204 always communicating with the pressure transmitting volume, closing of the check valve takes place as soon as possible thereby preventing a buildup of fluid velocity in the reverse direction. As is known, it is not always desirable to utilize a biasing means such as spring 190 of FIG. 4 for normally biasing the check valve toward the closed position. Thus without a closing bias on the valve, the problem of instantaneous closing before reverse flow velocities are built up become more critical. Furthermore, the fact that a closing bias on the valve exists prevents thermal cycling of the fluid through the check valve by permitting the disc to be slightly displaced from its seat during no flow conditions.

Another unique feature of the above-described valve structures lies in the fact that the narrowed ends 93 and 201 of the tapered housings 38 and 132, respectively, are formed to define the outward extent of the valve. This is achieved by forming the valve stub shafts 48 and 180 so that they are respectively always disposed in the central openings in the hubs 46 and 168 independently of the position of the valve discs 50 and 176. In this manner, the check valves of this invention are suitable for use in applications such as that defined in the aforementioned divisional application. With the disclosed arrangements, a biasing means such as springs 84 and 186, for permitting thermal cycling can still be enclosed and the advantages thereof retained.

It will be seen from the foregoing that novel and efficient forms of a check valve have been described herein. It is intended that the descriptive materials here employed are to be utilized for purposes of exemplifying the invention and are not to be interpreted as limitative thereof.

Accordingly, numerous modifications and embodiments of the invention will occur to those skilled in the art without departing from the spirit and scope of the invention. Moreover, it is to be understood that certain features of the invention can be employed without a corresponding use of other features.

Therefore, what is claimed as new is:

1. A check valve comprising a hollow outer casing having open ends, a streamlined housing secured to an inner wall of said casing, said housing having a flared end portion and a hub member secured to and extending centrally of said housing, said hub having a central longitudinal opening extending therethrough, a stub shaft mounted for longitudinal movement within said hub member, a valve disc secured to said shaft and engageable with the flared portion of said housing at an open position of said valve, said valve disc having a streamlined configuration complementary to said streamlined housing at said open position, said valve disc and said shaft being movable to a closed position of engagement of said valve disc with a valve seat formed in said casing, means coupled to said shaft and to said hub member for biasing said shaft and said valve disc to a preselected position, said means including an overhanging end member secured to the free end of said stub shaft and closely fitting within said opening in said hub member, a lip formed upon said hub member extending inwardly of said hub member opening at a position opposed to said overhanging end member whereby an annular dashpot space is formed between said shaft and the major proportion of said hub member, means including at least one passage coupled to said annular space to permit fluid to exit therefrom, and a compressional spring mounted within said annular space and bearing against said end member and said hub member lip.

2. A check valve comprising a hollow open-ended outer casing, a streamlined housing secured to an inner wall of said casing, said housing having a flared portion and a hub member secured to and extending centrally of said housing, said hub having the central longitudinal opening extending therethrough, a stub shaft mounted for longitudinal movement within said hub member opening, a valve disc secured to said shaft and engageable with the flared portion of said housing at the open position of said valve, said valve disc having a cooperating streamlined configuration, said valve disc and said shaft being movable to a closed position for engagement of said valve disc with a valve seat formed in said casing, means coupled to said shaft and to said hub member for biasing said shaft and said valve disc toward a preselected position, said means including an overhanging end member secured to the free end of said stub shaft and closely fitting within said opening in said hub member and a lip formed upon said hub member extending inwardly of said hub member opening adjacent the flared portion of said housing whereby an annular dashpot space is formed between said shaft and the major proportion of said hub member, and a compressional spring mounted within said annular space and bearing against said end member and said hub member lip, and damping means for preventing slamming of said valve disc when said valve is closed, said last-mentioned means comprising a longitudinal groove formed on at least one of said hub members and said stub shaft whereby controlled leakage of fluid into and out of said annular space occurs during longitudinal movement of said shaft.

3. A check valve comprising a hollow enclosure having at least a partially open side and open ends, said open ends adapted to be secured to fluid conduits so that fluid may pass through said enclosure, said valve including a flared annular housing spaced from the inner walls of said enclosure and disposed with a side surface thereof substantially coextensive with said open side, a valve seat located in said enclosure and spaced from the enlarged end of said housing, a valve disc located in said enclosure and disposed for bodily movement upon actuation by said fluid between the enlarged end of said housing and said valve seat, said valve disc having a mounting shaft secured thereto extending into said housing, said housing having a tubular hub thereon disposed to receive said shaft to permit longitudinal sliding movement of said shaft relative to said housing, said housing being formed with the portion thereof disposed adjacent said open side of said enclosure and the portion of said tubular hub disposed adjacent said open side of said enclosure being removably secured to the remainder of said housing and said hub, respectively, said housing portion being sized to pass through said open side to expose said shaft, and means removably secured to said enclosure for covering said open side.

4. A check valve comprising a hollow enclosure having at least a partially open side and open ends, said open ends adapted to be secured to fluid conduits so that fluid may pass through said enclosure, an annular housing disposed in said enclosure, said housing being axially split to form a bipartite member, one of the parts of said housing being fixedly secured to said enclosure, said housing including a generally tubular hub disposed therein, said hub being split axially to form a bipartite member, one of said hub parts being fixedly secured to said one housing part, the other of said hub parts being removably secured to said one hub part, a valve seat disposed in said enclosure, a valve disc mounted in said enclosure and engageable with said valve seat, a stub shaft secured to said valve disc, said shaft having its free end slidably disposed within the opening in said hub, the other of said housing parts and said other hub part each being located in substantial alignment with said open side of said enclosure so that said other housing part and said other hub part are removable through said open side, respectively, and means removably secured to said enclosure for covering said open side.

5. A check valve comprising a hollow enclosure having at least a partially open side and open ends, said open ends adapted to be secured to fluid conduits so that fluid may pass through said enclosure, an annular housing disposed in said enclosure, said housing being axially split to form a bipartite member, one of the parts of said housing being fixedly secured to said enclosure, said housing including a generally tubular hub disposed therein, said hub being split axially to form a bipartite member, one of said hub parts being fixedly secured to said one housing part, the other of said hub parts being removably secured to said one hub part, a valve seat disposed in said enclosure, a valve disc mounted in said enclosure and engageable with said valve seat, a stub shaft coupled to said valve disc, said shaft having its free end slidably disposed within the opening in said hub, said other hub part and the other of said housing parts each being located in substantial alignment with said open side of said enclosure so that said other hub part and said other housing part are respectively removable through said open side, and cover means removably secured to said enclosure for covering said open side, said cover means including a projection mounted therein and disposed, when said cover means is secured to said enclosure, to engage said one housing part to position the latter relative to said other housing part.

6. A check valve comprising a hollow enclosure having at least a partially open side and open ends, said open ends adapted to be secured to fluid conduits so that fluid may pass through said enclosure, said valve including a flared annular housing spaced from the inner walls of said enclosure and disposed with a side surface thereof coextensive with said open side, a valve seat located in said enclosure and spaced from the enlarged end of said housing, a valve disc located in said enclosure and disposed for bodily movement between the enlarged end of said housing and said valve seat, said valve disc having a mounting shaft secured thereto extending into said housing, said housing having an annular hub member disposed therein receiving said shaft, said shaft and said hub member being formed to permit longitudinal sliding movement of said shaft relative to said hub member, said disc and said housing being formed to enclose a pressure transmitting volume at the open position of said valve, at least one pressure transmitting aperture formed in the wall of said housing and always communicating with said volume, said housing and said hub member each having the portion thereof disposed adjacent said open side of said enclosure removably mounted on the remainder of said housing and said hub members, respectively, said last-mentioned housing and hub portions each being sized to pass through said open side, so that said shaft may be exposed to said open side, and means removably secured to said enclosure for covering said open side.

7. A check valve comprising a hollow enclosure having at least a partially open side and open ends, said open ends adapted to be secured to fluid conduits so that fluid may pass through said enclosure, said valve including a flared annular housing spaced from the inner walls of said enclosure and disposed with a side surface thereof coextensive with said open side, a valve seat located in said enclosure and spaced from the enlarged end of said housing, a valve disc located in said enclosure and disposed for bodily movement between the enlarged end of said housing and said valve seat, said valve disc having a mounting shaft secured thereto extending into said housing, said housing having an annular hub member disposed therein receiving said shaft, said shaft and said hub member being formed to permit longitudinal sliding movement of said shaft relative to said housing, said housing and said hub member each having the portion thereof disposed adjacent said open side of said enclosure removably mounted on the remainder of said housing and said hub members, respectively, said last-mentioned housing and hub portions each being sized to pass through said open side, so that said shaft may be exposed to said open side, and means removably secured to said enclosure for covering said open side.

References Cited by the Examiner
UNITED STATES PATENTS

| | | | |
|---|---|---|---|
| 425,276 | 4/90 | Warden | 137—517 |
| 1,448,717 | 3/23 | Slattery | 137—219 |
| 1,795,319 | 3/31 | Spohr. | |
| 1,802,720 | 4/31 | Junkers | 137—536 |
| 2,102,289 | 12/37 | Smolensky | 137—536 |
| 2,357,527 | 9/44 | Lundquist | 251—62 XR |
| 2,870,779 | 1/59 | Thomiszer | 137—542 XR |
| 2,917,077 | 12/59 | Ziege | 137—514.7 |

M. CARY NELSON, *Primary Examiner.*

ISADOR WEIL, MARTIN P. SCHWADRON,
*Examiners.*